Sept. 15, 1942.  C. L. EKSERGIAN  2,295,725
ACCELERATION RESPONSIVE DEVICE
Filed July 19, 1939
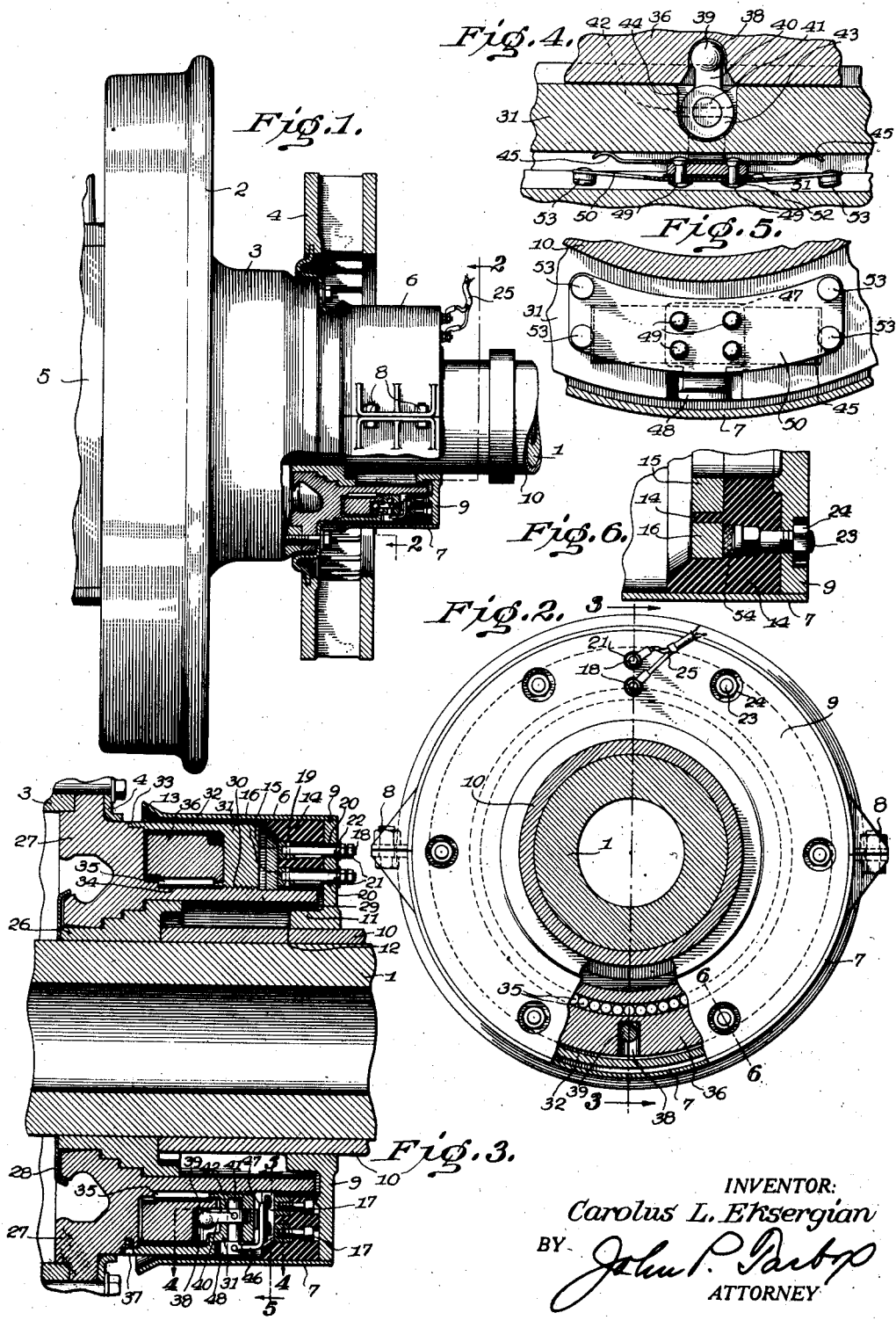
INVENTOR:
Carolus L. Eksergian
BY
ATTORNEY Patented Sept. 15, 1942

2,295,725

UNITED STATES PATENT OFFICE 2,295,725

ACCELERATION RESPONSIVE DEVICE

Carolus L. Eksergian, Detroit, Mich., assignor to Budd Wheel Company, Philadelphia, Pa., a corporation of Pennsylvania Application July 19, 1939, Serial No. 285,267

10 Claims. (Cl. 200—52)

The present invention relates to means which respond to the angular acceleration of a rotating element, that is, to the rate of change of angular velocity thereof, in either an increasing or decreasing sense. Such change of angular velocity is popularly called acceleration when the velocity increases and decleration when it decreases, but in physical discussions of the same the single term "acceleration" covers both phenomena, and this term will be so used herein for simplicity.

The present invention contemplates providing an inertia element supported on the device whose acceleration is to be determined, said inertia element being capable of independent motion to a slight extent, and cooperating with means to indicate such motion whenever it occurs.

More specifically, in one embodiment the invention comprises an inertia element mounted on a rotating device whose acceleration is to be determined, the mounting being as nearly devoid of friction as is reasonably attainable, so that the device and the inertia element will rotate synchronously with one another, when there is no acceleration, but so that the inertia element will tend to lead or lag with respect to the device whenever acceleration exists.

Still more specifically, the invention contemplates the provision of an inertia member, preferably a ring, mounted on the axle or hub of a wheel, such as those of railway or other vehicles, the said inertia member being supported by anti-friction bearings, and cooperating with an electric circuit or circuits, so as to control a switch or the like therein whenever the wheel or axle are sufficiently accelerated, as during braking or sudden starting etc.

When applied to a vehicle, the present invention may be used to produce an electrical impulse upon acceleration of the vehicle, and said impulse may be employed in any desired way, for instance to control the braking, to operate an indicator or recorder, to actuate an alarm, or any other purpose.

Other objects and advantages will be understood from the present specification and the drawing accompanying the same, disclosing a preferred embodiment of the invention.

In said drawing:

Fig. 1 is a fragmentary elevation of an axle having mounted thereon a wheel and brake disk, with the invention applied thereto, parts being shown in central longitudinal section;

Fig. 2 is an end elevation of a portion of the device shown in Fig. 1, on an enlarged scale, certain parts being omitted and others shown in section on the planes indicated by the broken line 2—2 of Fig. 1, looking in the direction of the arrows;

Fig. 3 is a fragmentary vertical longitudinal section through the structures shown in Fig. 2, the section being made on the plane indicated by the line 3—3;

Fig. 4 is an enlarged fragmentary sectional view of some of the structure shown in Fig. 3, the said section being made looking down on the horizontal plane indicated by the line 4—4, to show certain details on a much larger scale;

Fig. 5 is a similar enlarged detail sectional view of another portion of said structure, on the vertical plane indicated by the line 5—5 of Fig. 3, looking in the direction of the arrows; and Fig. 6 is a fragmentary detail sectional view, on the plane indicated by the line 6—6 of Fig. 2.

In all the figures, similar elements are designated by the same reference characters.

Referring first more particularly to Fig. 1, there is shown an axle 1 carrying a wheel 2 having a hub 3 on which is mounted a brake disk 4, the axle being mounted in the pedestal 5. It is obviously immaterial whether the wheel is rigid on the axle or moves on said axle, although purely for purposes of illustration and not in any way in a limitative sense, the wheel 2 is herein disclosed as rotatable on the axle 1, that is, the axle is stationary.

The acceleration-responsive mechanism may be housed in a removable casing comprising the upper half 6 and the lower half 7, which are secured to one another by bolts and nuts 8, and closed at one end by the plate 9. The whole casing may be supported by a sleeve 10 upon which is mounted the collar 11 integral with the plate 9, and welded to the sleeve 10 as shown at 12. The casing 6, 7 may have a flare 13 at its other end, to deflect foreign matter, and allow water or other liquid to drip off, thus preventing it from creeping into the casing.

At the end of the casing adjacent the plate 9, a ring 14 made of insulating material is provided. This ring serves as a convenient support for electrical conductors which must be maintained out of electrical contact with the rest of the structure. In the embodiment illustrated, there are shown two metal rings, 15 and 16, mounted in the ring 14, and substantially flush with its surface, although such position is not an essential feature.

The conductive rings 15 and 16 may be held in place in any suitable way, as by the screws 17 and the studs 18. Said studs 18 are secured to the respective rings, as by pins 19, and are insulated from the plate 9 by bushings 20. They are preferably screw-threaded at their outer ends, and provided with nuts 21 for securing the external electrical connecting wires 25 thereto, insulating washers 22 being provided to prevent contact with the metal of the casing. The ring 14 may itself be held in place by the bolts 23 and nuts 24 extending through the plate 9 as shown best in Figs. 2 and 6. The heads of these bolts may be covered with insulating material 54, to prevent contact with the ring 16.

In order to close the casing, a stepped sleeve 26 may be mounted on the axle 1, interfitting the corresponding step bores in the cooperating sleeve 27, carried by the hub 3, a dished cover 28 being provided to cover their joint, as shown. The sleeve 27 has a cylindrical extension 29, projecting over the sleeve 10 and having a screw-threaded portion 30 which is engaged by the internal screw-threads in the thickened end portion 31 of a shell 32.

This shell has an end portion 33 of reduced thickness, seated in a shouldered portion of the sleeve 27, and held there by suitable means, such as the screws 37, so as to form tight joints with the sleeve 27 at 30 and at 33, and thus provide an oil tight enclosure of substantially annular form between the shell and the sleeve.

The sleeve 27 has a portion 34 machined to serve as the inner race of a roller bearing of the "needle" type, whereon are mounted relatively many rolls or needles 35, and on said needles is mounted the inertia member, here shown as the metal ring 36. This ring is maintained immersed in oil within its casing, thus protecting the ring and the needles against undue friction and against the entrance of foreign matter.

At one point of its periphery the ring 36 is cut away, as shown at 38 in Figs. 2, 3 and 4, to provide a cavity suitable to accommodate the approximately spherical end portion 39 of the outer end of a lever 40 which is secured at its inner end 43 to a shaft 41 in any suitable manner, as by the pin 42. The inner end 43 is received in a cavity 44 in the thick bottom 31 of the shell 32, while the shaft 41 fits in a bore in said bottom, so that the said lever and shaft mutually hold one another in proper position.

Since the bottom of end plate 31 moves as an integral rigidly connected part of the wheel hub, it is clear that the ring 36 must also move substantially in synchronism therewith, because of the ball-lever 40, which permits only slight deviations because of the limited play. In order to provide a normal bias to keep the ring 36 substantially in the center of its said play, a spring 45 is provided and is attached to the outer end of the shaft 41, as follows:

A lever 46, having a cylindrical end portion 48 surrounding the end of the shaft 41 and pinned thereto, is bent substantially at right angles to provide an arm 47 extending toward the axle 1 (Figs. 3 and 4). The spring 45, above mentioned, is secured to this arm 47 by suitable means, such as the rivets 49 which also serve to secure a contact closing member 50 to the said arm 47. While the spring 45 need not be insulated from any of the other parts, since it serves merely a mechanical function, it is preferred to provide insulation 51 between the member 50 and the arm 47, and also insulating bushings 52 so that the member 50 will not be grounded at any point.

The contact closing member 50 may itself be a leaf spring, and carries the knobs 53 which normally are adjacent the contact rings 15 and 16, but spaced therefrom as clearly shown in Figs. 1 and 3. The spring 45, which bears at its ends against the bottom 31 of the shell 32, is made of sufficient strength to keep the lever 40 in substantially the position shown in Fig. 4, in which the ring 36 has its cavity 38 approximately at the mid-point of its possible play.

However, when sufficient acceleration exists in the motion of the wheel 2, the force produced by the inertia of the ring 36 will suffice to overcome the resistance of the spring 45, and to force the ball 39 to one side or the other. In either event, regardless of the direction it is forced, one set of contact knobs 53, or the other, will be brought into electrical contact with the rings 15 and 16, and thus will establish electrical connection therebetween. These knobs 53 will slide around said rings, to maintain such contact as long as the excessive acceleration prevails, but then will again break the contact, when acceleration becomes normal, so that most of the time the knobs 53 will be out of contact with the rings, thus avoiding useless wear of both the rings and the contacts.

The wires 25, connected to the studs 18 and thus to the rings 15 and 16, may lead to any electrically actuated device and will close the circuit when the acceleration exceeds a predetermined value, regardless of whether the acceleration is positive or negative ("deceleration") and regardless of the direction of rotation of the device.

When applied to a railway vehicle or the like, the adjustments may be made in such way that the circuit will be closed whenever the wheels slide because of excessive braking, or when sliding is imminent, if preferred, so that wheel-slide may be actually prevented from taking place. Aside from or in addition to this function, the device may also actuate an indicator, recorder, alarm, or other signal and may be used in the operation of vehicles as well as in testing brakes or the like.

While a preferred form of the invention has been disclosed in detail herein, it is to be clearly understood that the same is capable of modification in many respects without departing from the inventive concept, and that the embodiment chosen for illustration is merely one of the many possible modifications of the invention. Therefore, the invention is to be understood to be defined solely by the following claims.

I claim:

1. An acceleration responsive device comprising a closed oil-tight casing securable to a rotatable object, an oil-immersed inertia member in said casing rotating therewith, said member having a limited extent of freedom of rotary movement with respect to the casing, and an electric contact closing means disposed outside said casing and cooperating through the casing wall with the inertia member, to close said contact whenever the rotation has excessive acceleration.

2. An acceleration responsive device comprising a rotary object whose acceleration is to be indicated, a closed oil-tight casing rotating therewith, an oil-immersed inertia member carried therein by said casing and mounted to rotate therewith, but having a limited range of independent leading or lagging movement with respect to said casing, positive means to prevent the inertia member from exceeding said range, means for biasing said inertia member to return it to the mid-point of such range when no acceleration is active, and means outside said casing actuated by the inertia member whenever the said inertia member leads or lags, due to the presence of acceleration exceeding a definite value.

3. An acceleration responsive device comprising a closed oil-tight casing securable to a rotatable object, an oil-immersed inertia member in said casing and rotating therewith, said member having a limited extent of freedom of rotary movement with respect to the casing, electric contact closing means disposed outside the casing including an element carried by the casing, and means extending from said element through the casing wall into the inertia member, to close said contact means whenever the inertia member shifts angularly around the casing.

4. An acceleration responsive device comprising a casing securable to a rotatable object, an inertia ring in said casing and rotating therewith, said ring being of large internal diameter and having a limited extent of freedom of rotary movement with respect to the casing, a large diameter roller bearing between the casing and the ring, said ring having a part of its periphery cut away, and an electric contact closing means carried by the casing and having an operating member extending into the said cut away portion of the inertia ring, to cause it to close said contact whenever the ring shifts angularly, due to excessive acceleration of the rotatable object.

5. An acceleration responsive instrument comprising a rotary inertia device, a device whose acceleration is to be indicated, an anti-friction bearing carried by the second device and supporting said inertia device thereon, an electric switch carried by one of said devices and having an actuating element extending into the other, said switch having resilient means tending normally to maintain the two devices in synchronism with one another, said resilient means being overcome by the force produced by inertia when excessive acceleration exists, whereby said switch remains open when said devices rotate in synchronism with one another, but closes whenever one of the devices lags or leads with respect to the other.

6. An acceleration responsive instrument comprising a rotary inertia device, a device whose acceleration is to be indicated, an anti-friction bearing carried by the second device and supporting said inertia device thereon, an electric switch carried by one of said devices and having an actuating element extending into the other, said other device having a cavity to receive it, said cavity being of sufficient size to permit a predetermined degree of angular motion of one device with respect to the other, whereby said switch remains open when said devices rotate in synchronism with one another, but closes whenever one of the devices lags or leads with respect to the other.

7. In combination, a rotatable member, an oil-tight casing carried thereby, means including an inertia element and oil-immersed bearing means for said element in said casing, means outside said casing responsive to effects of movement of said element relative to said member, and means for transmitting said effects from said element through the wall of said casing to said responsive means.

8. In combination, a rotatable member, an oil-tight casing carried thereby, means including an inertia element and oil-immersed bearing means for said element in said casing, non-rotative support means outside said casing, means including means on said non-rotative support responsive to movement of said element relative to said member, and means for transmitting motion resulting from said movement to said responsive means through the wall of the casing.

9. In combination, a non-rotative axle, a vehicle wheel rotatably mounted on said axle, an oil-tight casing carried by the wheel about the axle, means including an inertia element and oil-immersed bearing means for said element in said casing, a housing fixed to said non-rotative axle and partially enclosing said casing, means in said fixed housing affected by movement of said element relative to said wheel, and means for transmitting effects from said element through the wall of said casing to the means in the fixed housing.

10. In combination, a rotatable member, an inertia element of large internal diameter carried by, and rotatable with, said member and having limited freedom of rotary movement relative thereto, a bearing between said member and said inertia element including rollers arranged in an annular series of large diameter, a non-rotative support, electric circuit control means carried by said non-rotative support, and means cooperating between said inertia element and said control means and responsive to predetermined accelerated rotation of said member causing movement of said element relative to said member for actuating said control means.

CAROLUS L. EKSERGIAN.